(12) United States Patent
Kleinschmidt

(10) Patent No.: US 6,747,741 B1
(45) Date of Patent: Jun. 8, 2004

(54) MULTIPLE-PASS INTERFEROMETRIC DEVICE

(75) Inventor: Juergen Kleinschmidt, Weissenfels (DE)

(73) Assignee: Lambda Physik AG, Goettingen (DE)

( * ) Notice: Subject to any disclaimer, the term of this patent is extended or adjusted under 35 U.S.C. 154(b) by 25 days.

(21) Appl. No.: 09/975,091

(22) Filed: Oct. 9, 2001

Related U.S. Application Data

(60) Provisional application No. 60/239,686, filed on Oct. 12, 2000.

(51) Int. Cl.[7] .................................................. G02B 9/02
(52) U.S. Cl. ....................................... 356/454; 356/519
(58) Field of Search .................................. 356/454, 519

(56) References Cited

U.S. PATENT DOCUMENTS

| | | | |
|---|---|---|---|
| 3,806,829 A | | 4/1974 | Duston et al. |
| 4,014,614 A | * | 3/1977 | Sandercock ................ 356/454 |
| 4,016,504 A | | 4/1977 | Klauminzer |
| 4,309,671 A | | 1/1982 | Malyon |
| 4,319,843 A | | 3/1982 | Gornall |
| 4,331,937 A | | 5/1982 | Brown et al. |
| 4,348,647 A | | 9/1982 | Nighan et al. |

(List continued on next page.)

FOREIGN PATENT DOCUMENTS

| | | |
|---|---|---|
| DE | 40 29 687 A1 | 9/1990 |
| DE | 40 29 687 A1 | 4/1992 |
| DE | 42 25 781 A1 | 8/1992 |
| DE | 41 14 407 A1 | 11/1992 |
| DE | 42 25 781 A1 | 2/1994 |
| DE | 295 21 572 U1 | 12/1997 |
| DE | 298 22 082 U1 | 2/1999 |

(List continued on next page.)

OTHER PUBLICATIONS

Emara, S., "Wavelength Shifts in $Hg^{198}$ as a Function of Temperature," *Journal of Research of the National Bureau of Standards—A. Physics and Chemistry*, vol. 65A, No. 6, Nov.–Dec. 1961, pp. 473–474.

J. Caplan, "Temperature and Pressure Effects on Pressure–Scanned Etalons and Gratings," *Applied Optics*, vol. 14, No. 7, Jul. 1975, pp. 1585–1591.

Masakatsu Okada et al., "Electronic Tuning of Dye Lasers by an Electro–optic Birefringent Fabry—Perot Etalon," *Optics Communications*, vol. 14, No. 1, pp. 4–7, 1975.

R.B. Green et al., "Galvanic Detection of Optical Absorptions in a Gas Discharge," *Applied Physics Letters*, vol. 29, No. 11, pp. 727–729, Dec. 1, 1976.

H. H. Barrett, et al., "Retroreflective arrays as approximate phase conjugators," *Opt. Lett. 4*. vol. 4, No. 6, 1979, pp. 190–192.

(List continued on next page.)

*Primary Examiner*—Samuel A. Turner
*Assistant Examiner*—Patrick Connolly
(74) *Attorney, Agent, or Firm*—Stallman & Pollock LLP

(57) ABSTRACT

An apparatus measures a spectral distribution of a narrow-band laser beam generated by a line-narrowed excimer laser or a molecular fluorine laser system. The apparatus includes an an interferometric device disposed along an optical path of an output beam of the laser system such that the beam traverses the interferometric device on a first pass, a retro-reflector disposed after the interferometric device along the optical path for retro-reflecting the beam back through the interferometric device on a second pass, and a detector for detecting an intensity of the beam after the second pass through the interferometric device. Preferably, spectral information is determined when the free spectral range of the interferometric device is tuned and the detector measures the intensity of the beam at a plurality of free spectral ranges or when the wavelength of the output beam is tuned.

49 Claims, 3 Drawing Sheets

U.S. PATENT DOCUMENTS

| | | |
|---|---|---|
| 4,393,505 A | 7/1983 | Fahlen |
| 4,399,540 A | 8/1983 | Bucher |
| 4,404,366 A | 9/1983 | Boguslaski et al. |
| 4,435,808 A | 3/1984 | Javan |
| 4,468,773 A | 8/1984 | Seaton |
| 4,513,422 A | 4/1985 | Buholz |
| 4,558,952 A | 12/1985 | Kulesh et al. |
| 4,592,043 A | 5/1986 | Williams |
| 4,611,270 A | 9/1986 | Klauminzer et al. |
| 4,616,908 A | 10/1986 | King |
| 4,691,322 A | 9/1987 | Nozue et al. |
| 4,823,354 A | 4/1989 | Znotins et al. |
| 4,829,536 A | 5/1989 | Kajiyama et al. |
| 4,856,018 A | 8/1989 | Nozue et al. |
| 4,860,300 A | 8/1989 | Baumler et al. |
| 4,905,243 A | 2/1990 | Lokai et al. |
| 4,911,778 A | 3/1990 | Barnoach |
| 4,914,662 A | 4/1990 | Nakatani et al. |
| 4,926,428 A | 5/1990 | Kajiyama et al. |
| 4,975,919 A | 12/1990 | Amada et al. |
| 4,977,563 A | 12/1990 | Nakatani et al. |
| 4,977,573 A | 12/1990 | Bittenson et al. |
| 5,025,445 A | 6/1991 | Anderson et al. |
| 5,081,635 A | 1/1992 | Wakabayashi et al. |
| 5,095,492 A | 3/1992 | Sandstrom |
| 5,142,543 A | 8/1992 | Wakabayashi et al. |
| 5,144,632 A | 9/1992 | Thonn |
| 5,150,370 A | 9/1992 | Furuya et al. |
| 5,198,872 A | 3/1993 | Wakabayashi et al. |
| 5,218,421 A | 6/1993 | Wakabayashi et al. |
| 5,221,823 A | 6/1993 | Usui |
| 5,225,884 A | 7/1993 | Stark et al. |
| 5,226,050 A | 7/1993 | Burghardt |
| 5,247,531 A | 9/1993 | Mueller-Horsche |
| 5,307,364 A | 4/1994 | Turner |
| 5,337,330 A | 8/1994 | Larson |
| 5,373,515 A | 12/1994 | Wakabayashi et al. |
| 5,396,514 A | 3/1995 | Voss |
| 5,404,366 A | 4/1995 | Wakabayashi et al. |
| 5,420,877 A | 5/1995 | Sandstrom |
| 5,450,207 A | 9/1995 | Fomenkov |
| 5,450,436 A | 9/1995 | Mizoguchi et al. |
| 5,479,431 A | 12/1995 | Sobottke et al. |
| 5,535,233 A | 7/1996 | Mizoguchi et al. |
| 5,557,629 A | 9/1996 | Mizoguchi et al. |
| 5,559,584 A | 9/1996 | Miyaji et al. |
| 5,559,816 A | 9/1996 | Basting et al. |
| 5,596,596 A | 1/1997 | Wakabayashi et al. |
| 5,642,374 A | 6/1997 | Wakabayashi et al. |
| 5,659,419 A | 8/1997 | Lokai et al. |
| 5,663,973 A | 9/1997 | Stamm et al. |
| 5,684,822 A | 11/1997 | Partlo |
| 5,729,562 A | 3/1998 | Birx et al. |
| 5,729,565 A | 3/1998 | Meller et al. |
| 5,748,316 A | 5/1998 | Wakabayashi et al. |
| 5,748,346 A | 5/1998 | David et al. |
| 5,761,236 A | 6/1998 | Kleinschmidt et al. |
| 5,763,855 A | 6/1998 | Shioji |
| 5,764,678 A | 6/1998 | Tada |
| 5,771,094 A | 6/1998 | Carter et al. |
| 5,802,094 A | 9/1998 | Wakabayashi et al. |
| 5,811,753 A | 9/1998 | Weick et al. |
| 5,818,865 A | 10/1998 | Watson et al. |
| 5,835,520 A | 11/1998 | Das et al. |
| 5,844,727 A | 12/1998 | Partlo |
| 5,852,627 A | 12/1998 | Ershov |
| 5,856,991 A | 1/1999 | Ershov |
| 5,867,514 A | 2/1999 | Anderson |
| 5,875,207 A | 2/1999 | Osmanow |
| 5,898,725 A | 4/1999 | Fomenkov et al. |
| 5,901,163 A | 5/1999 | Ershov |
| 5,914,974 A | 6/1999 | Partlo et al. |
| 5,917,849 A | 6/1999 | Ershov |
| 5,936,988 A | 8/1999 | Partlo et al. |
| 5,940,421 A | 8/1999 | Partlo et al. |
| 5,946,337 A | 8/1999 | Govorkov et al. |
| 5,949,806 A | 9/1999 | Ness et al. |
| 5,970,082 A | 10/1999 | Ershov |
| 5,978,391 A | 11/1999 | Das et al. |
| 5,978,394 A | 11/1999 | Newman et al. |
| 5,978,406 A | 11/1999 | Rokni et al. |
| 5,978,409 A | 11/1999 | Das et al. |
| 5,982,795 A | 11/1999 | Rothweil et al. |
| 5,982,800 A | 11/1999 | Ishihara et al. |
| 5,991,324 A | 11/1999 | Knowles et al. |
| 5,999,318 A | 12/1999 | Morton et al. |
| 6,005,880 A | 12/1999 | Basting et al. |
| 6,014,206 A | 1/2000 | Basting et al. |
| 6,014,398 A | 1/2000 | Hofmann et al. |
| 6,020,723 A | 2/2000 | Desor et al. |
| 6,028,872 A | 2/2000 | Partlo et al. |
| 6,028,879 A | 2/2000 | Ershov |
| 6,028,880 A | 2/2000 | Carlesi et al. |
| 6,061,129 A | 5/2000 | Ershov et al. |
| 6,061,382 A | 5/2000 | Govorkov et al. |
| 6,078,599 A | 6/2000 | Everage et al. |
| 6,081,542 A | 6/2000 | Scaggs |
| 6,084,897 A | 7/2000 | Wakabayashi et al. |
| 6,094,448 A | 7/2000 | Fomenkov et al. |
| 6,141,081 A | 10/2000 | Das et al. |
| 6,151,346 A | 11/2000 | Partlo et al. |
| 6,154,470 A | 11/2000 | Basting et al. |
| 6,157,662 A | 12/2000 | Scaggs et al. |
| 6,160,831 A | 12/2000 | Kleinschmidt et al. |
| 6,160,832 A | 12/2000 | Kleinschmidt et al. |
| 6,163,559 A | 12/2000 | Watson |
| 6,198,761 B1 | 3/2001 | von Bergmann et al. |
| 6,212,214 B1 | 4/2001 | Vogler et al. |
| 6,219,368 B1 | 4/2001 | Govorkov |
| 6,226,307 B1 | 5/2001 | Desor et al. |
| 6,240,110 B1 | 5/2001 | Ershov |
| 6,243,163 B1 | 6/2001 | Wakabayashi et al. |
| 6,243,170 B1 * | 6/2001 | Ershov ...................... 356/519 |
| 6,243,405 B1 | 6/2001 | Borneis et al. |
| 6,243,406 B1 | 6/2001 | Heist et al. |
| 6,269,110 B1 | 7/2001 | Leinhos et al. |
| 6,272,158 B1 | 8/2001 | Kleinschmidt et al. |
| 6,285,701 B1 | 9/2001 | Albrecht et al. |
| 6,298,080 B1 | 10/2001 | Heist et al. |
| 6,324,196 B1 | 11/2001 | Desor |
| 6,327,284 B1 | 12/2001 | Stamm et al. |
| 6,327,290 B1 | 12/2001 | Govorkov et al. |
| 6,345,065 B1 | 2/2002 | Kleinschmidt et al. |
| 2001/0013933 A1 | 8/2001 | Smith et al. |

FOREIGN PATENT DOCUMENTS

| | | |
|---|---|---|
| DE | 298 22 090 U1 | 2/1999 |
| DE | 298 22 082 | 3/1999 |
| DE | 298 22 090 | 3/1999 |
| DE | 299 07 349 U1 | 7/2000 |
| DE | 199 15 741 A1 | 10/2000 |
| DE | 199 61 908 A1 | 8/2001 |
| EP | 0 472 727 B1 | 11/1990 |
| EP | 0 570 243 A1 | 5/1993 |
| EP | 0 454 399 B1 | 9/1995 |
| EP | 0 855 811 A2 | 7/1998 |
| EP | 0 875 743 A1 | 11/1998 |
| EP | 0 867 989 B1 | 9/1999 |
| EP | 1 063 503 A1 | 12/2000 |
| JP | 2-631554 | 4/1997 |
| WO | WO 96/07224 | 3/1996 |

| WO | WO 01/18923 A1 | 3/2001 |
| WO | WO 01/46658 A1 | 6/2001 |

OTHER PUBLICATIONS

R.A. Keller et al., "Opto–galvanic Spectroscopy in a Hollow Cathode Discharge," *J. Opt. Soc. Am.*, vol. 69, No. 5, pp. 738–742, May 1979.

Richard A. Keller et al., Atlas for Optogalvanic Wavelength Calibration, *Applied Optics*, vol. 19, No. 6, pp. 836–837, Mar. 15, 1980.

N. Tan–No, et al., "Dispersion–free amplification and oscillation in phase–conjugate four–wave mixing in an atomic vapor doublet," *IEEE J. Quantum Electronics*, 16, 1980, pp. 147–153.

W. Demtröder, *Laser Spectroscopy*, published by Springer, Berlin 1981, Chapter 4: Spectroscopic Instrumentation, pp. 99–221.

M.D. Levenson, et al., "Projection photolithography by wave–front conjugation," *J. Opt. Soc. Am*, vol. 71, No. 6, Jun. 1981, pp. 737–743.

T.R. Hicks, "Tunable Fabry–Perot Filters," *Opt. Eng.*, vol. 20, No. 6 (1981) pp. 806–514.

Norman J. Dovichi, et al., "Use of the Optogalvanic Effect and the Uranium Atlas for Wavelength Calibration of Pulsed Lasers," *Applied Optics*, vol. 21, No. 8, pp. 1468–1473, Apr. 12, 1982.

D.L. Jordan, et al., "Experimental Measurements of Non–Gaussian Scattering by a Fractal Diffuser," *Applied Physics B.*, vol. 31, 1983, pp. 179–186.

P. Camus, "Atomic Spectroscopy with Optogalvanic Detection," *Journal De Physique*, (Paris) 11C7, pp. C7–87–106, Nov. 1983.

R. Martinez–Herrero, et al., "Transmitted Amplitude by a Fabry–Perot Interferometer with Random Surface Defects," *Applied Optics*, vol. 24, No. 3, Feb. 1, 1985, pp. 315–316.

D.P. Mahapatra, et al., "Exact Evaluation of the Transmittal Amplitude for a Fabry–Perot Interferometer with Surface Defects," *Applied Optics*, vol. 25, No. 10, May 26, 1986, pp. 1646–1649.

Andersson, M., et al., "Compressible Favry–Perot Refractometer," *Applied Optics*, vol. 26, No. 22, Nov. 15, 1987, pp. 4835–4840.

F. Babin et al., "Ultraviolet Optogalvanic Laser Spectroscopy of Iron for Reference Wavelengths," *Optics Letters*, vol. 12, No. 7, pp. 468–470, Jul. 1987.

D.R. Hall, et al., *The Physics and Technology of Laser Resonator*, 1989, pp. 1–20, 94–104, 117–131, 143–153, 176–189, 220–245.

R.S. Sandstrom, "Argon Fluoride Excimer Laser Source for Sub–0.25mm Optical Lithography," *Optical/Laser Microlithography IV*, vol. 1463, pp. 610–616, 1991.

R.K. Tyson, *Principles of Adaptive Optics, $2^{nd}$ Edition*, 1991, Chapter 5: Wavefront Sensing, pp. 121–202.

Sansonetti, J.E., et al., "Atlas of the Spectrum of a Platinum/ Neon Hollow–Cathode Reference Lamp in the Region 1130–4330 A", *Journal of Research of the National Institute of Standards and Technology*, vol. 97, No. 1, Jan.–Feb. 1992, 1–211.

M. Kakehata, et al., "Output Characteristics of a Discharge–pumped Fe Laser (157nm) with an Injection–seeded Unstable Resonator," *J. Appl. Phys.*, vol. 74, No. 4, Aug. 15, 1993, pp. 2241–2246.

S. M. Hooker, et al., "Progress in Vacuum Ultraviolet Lasers," *Progress in Quantum Electronics*, vol. 18, 1994, pp. 227–274.

MacBride, et al., "Effect of Temperature Variation on FT–IR Spectomoter Stability," *Applied Spectroscopy*, 1997, vol. 51, No. 1, pp. 43–50.

Wakabayashi, et al., "Billion Level Durable ArF Excimer Laser with Highly Stable Ernergy," *SPIE $24^{th}$ Annual International Symposium on Microlithography*, Santa Clara, Calif., May 14–19, 1999.

A. I. Ershov, et al., "Novel Metrology for Measuring Spectral Purity of KrF Lasers for Deep UV Lithography," *Proceedings of SPIE*, vol. 3677, Jun. 1999, pp. 611–620.

Sansonetti, et al., "Precision Measurement of Wavelengths Emitted by a Molecular Fluorine Laser at 157 nm," *Applied Optics*, vol. 40, No. 12, Apr. 20, 2001, pp. 1974–1978.

* cited by examiner

MULTIPLE-PASS INTERFEROMETRIC DEVICE

This application claims the benefit of priority to U.S. provisional patent application No. 60/239,686, filed Oct. 12, 2000.

BACKGROUND OF THE INVENTION

1. Field of the Invention

The invention relates to laser spectrometry, and particularly to an apparatus and method for improving the resolution of a spectrometer for measuring parameters of a laser beam.

2. Discussion of the Related Art

Semiconductor manufacturers are currently using deep ultraviolet (DUV) lithography tools based on KrF-excimer laser systems operating around 248 nm, as well as the following generation of ArF-excimer laser systems operating around 193 nm. The $F_2$-laser operating around 157 nm is being developed for use with Vacuum UV (VUV) photolithography. Higher energy, higher stability, and higher efficiency excimer and molecular fluorine lasers are being developed as lithographic exposure tools for producing very small structures as chip manufacturing proceeds into the 0.10 micron regime and beyond. Specific characteristics of laser systems sought to be improved upon particularly for the lithography market include higher repetition rates, increased energy stability and dose control, increased percentage of system uptime, narrower output emission bandwidths, improved wavelength and bandwidth accuracy, and improved compatibility with stepper/scanner imaging systems.

It is recognized herein that various components and tasks relating to today's lithography laser systems may be advantageously designed to be computer- or processor-controlled. The processors may be programmed to receive various inputs from components within the laser system, and to signal those components and others to perform adjustments such as gas mixture replenishment, discharge voltage control, burst control, alignment of resonator optics for energy, linewidth or wavelength adjustments, among others.

It is important for their respective applications to the field of sub-quarter micron silicon processing that each of the above laser systems become capable of emitting a narrow spectral band of known bandwidth and around a very precisely determined and finely adjustable absolute wavelength. Techniques for reducing bandwidths by special resonator designs to less than 100 pm for use with all-reflective optical imaging systems, and for catadioptric imaging systems to less than 0.6 pm, are being continuously improved upon. Depending on the laser application and imaging system for which the laser is to be used, line-selection and/or line-narrowing techniques are described at U.S. patent applications Ser. Nos. 09/317,695, 09/244,554, 09/452,353, 09/602,184, 09/599,130 and 09/629,256, each of which is assigned to the same assignee as the present application, and U.S. Pat. Nos. 5,761,236, 6,081,542, 6,061,382, 5,946,337, 6,285,701, 6,154,470, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, and 4,829,536, all of which are hereby incorporated by reference. Some of the line selection and/or line narrowing techniques set forth in these patents and patent applications may be used in combination.

Techniques are also available for tuning and controlling central wavelengths of emission. Absolute wavelength calibration techniques use a known absorption, emission or level-transition line around the wavelength of interest as a reference (see U.S. Pat. Nos. 4,905,243, 4,926,428, 5,450,207, 5,373,515, 5,978,391, 5,978,394, 6,160,832 and 4,823,354, and F. Babin et al., Opt. Lett., v. 12, p. 486 (1987), and R. B. Green et al., Appl. Phys. Lett., v. 29, p. 727 (1976), as well as U.S. patent applications Ser. Nos. 09/416,344 and 09/791,431 (each application being assigned to the same assignee as the present application), all of the above being hereby incorporated by reference).

The '243 patent, also mentioned above, describes the use of a monitor Fabry-Perot etalon to determine relative wavelength shifts away from the known Fe absorption lines, e.g., at 248.3271 nm and 248.4185 nm, among others. To do this, the laser wavelength is first calibrated to the absolute wavelength reference line, e.g., 248.3271 nm, and the laser beam is directed through the etalon. An interferometric image is projected onto a solid state image detector such as a CCD array. Next, the laser wavelength is tuned away from the 248.3271 nm line to a new wavelength. A new image is projected onto the detector, and a comparison with the original image reveals the new wavelength because the free spectral range (FSR) of the monitor etalon is presumably known (e.g., 9.25 pm). For example, if it is desired to tune the laser to 248.3641 nm, then the wavelength would be adjusted 37 pm above the 248.3271 nm Fe vapor absorption line to exactly coincide with four FSRs of the monitor etalon.

Other optical characteristics of a laser beam that are desired to know and control are the bandwidth and spectral purity. The bandwidth can be measured as the full width at half maximum (FWHM) of a spectral intensity distribution of a measured laser pulse. The spectral purity is determined as the spectral range within which lies 95% of the energy of the laser pulse.

The bandwidth of a radiation source used, e.g., in photolithographic applications, is constrained by its effect on imaging resolution due to chromatic aberrations in optics of catadioptric imaging systems. The bandwidth of a laser beam can be determined from measuring the widths of fringes produced as the laser beam is passed through a monitor etalon and projected onto a CCD array. A grating spectrometer may also be used and the bandwidth measured in a similar fashion (see U.S. Pat. Nos. 5,081,635 and 4,975,919, each of which is hereby incorporated by reference). It is desired, however, to have a technique for more precisely determining spectral information such as the bandwidth, spectral purity and/or wavelength of a laser beam.

SUMMARY OF THE INVENTION

An apparatus measures a spectral distribution of a narrow-band laser beam generated by a line-narrowed excimer laser or a molecular fluorine laser system. The apparatus includes an an interferometric device disposed along an optical path of an output beam of the laser system such that the beam traverses the interferometric device on a first pass, a retro-reflector disposed after the interferometric device along the optical path for retro-reflecting the beam back through the interferometric device on a second pass, and a detector for detecting an intensity of the beam after the second pass through the interferometric device. Preferably, spectral information is determined when the free spectral range of the interferometric device is tuned and the detector measures the intensity of the beam at a plurality of free spectral ranges or when the wavelength of the output beam is tuned. A light guidance cable may also be provided for directing the beam towards the interferometric device. The apparatus may also be configured such that the beam makes a third interferometric pass prior to being incident upon the detector.

BRIEF DESCRIPTION OF THE DRAWINGS

FIG. 4b shows integrated spectra of the plots shown in FIG. 4a.

INCORPORATION BY REFERENCE

What follows is a cite list of references which are, in addition to any references cited above in the background section or below in the detailed description of the preferred embodiments, and the background section itself, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

U.S. Pat. Nos. 6,243,170 B1, 5,081,635, 4,975,919, 4,905,243, 4,926,428, 5,450,207, 5,373,515, 5,978,391, 5,978,394, 6,160,832 and 4,823,354;

F. Babin et al., Opt. Lett., v. 12, p. 486 (1987), and

R. B. Green et al., Appl. Phys. Lett., v. 29, p. 727 (1976),

U.S. patent applications Ser. Nos. 09/416,344 and 09/791,431

U.S. published application Ser. Nos. 2001/0013933 A1

DETAILED DESCRIPTION OF THE PREFERRED EMBODIMENT

Figure 1:
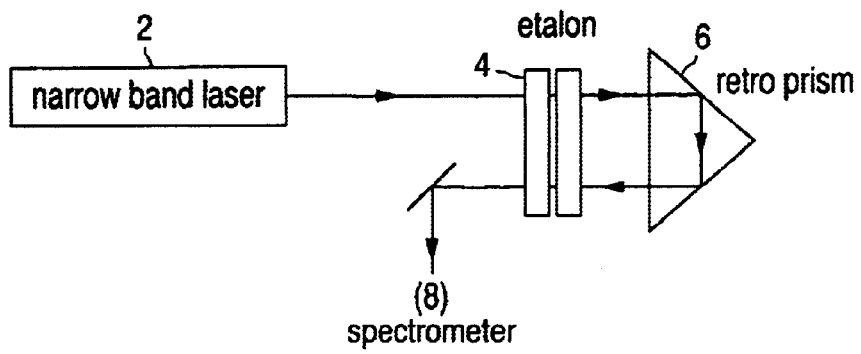
FIG. 1 schematically illustrates a double-pass etalon arrangement to generate very narrow band UV light for measuring the apparatus function, e.g., of a spectrometer FIG. 2 schematically illustrates this apparatus function measured by the double-pass etalon schematically illustrated at FIG. 1.

FIG. 1 schematically illustrates a double-pass etalon arrangement for measuring an apparatus function of a spectrometer, according to a preferred embodiment. A laser output beam is generated by a narrow band laser 2, or a tunable laser, or other laser wherein it may be desired to know the wavelength, bandwidth, spectral purity or other spectral parameter or other laser system wherein it is desired to measure the apparatus function of the emitted beam. The output beam generated by the laser 2 is shown in FIG. 1 being incident upon and traversing an etalon 4. The etalon 4 shown is a transmissive etalon, and the arrangement shown in FIG. 1 may be modified for use with a reflective etalon, such as, e.g., by re-directing the beam using a beam splitter prior to its being incident upon the etalon 4 and then disposing the retro-reflector (see below) behind the beam splitter.

The etalon 4 may be replaced by another interferometric device not including parallel plates to produce the interference spectrum. Such an interferometric device may include a pair of non-parallel, opposed reflecting surfaces or opposed reflecting surfaces that are relatively disposed in a step-like design, wherein the spacing between the plates is not constant along the entirety of the surfaces of the plates. Examples of such devices that are alternative to the etalon 4 are described at U.S. patent applications Ser. Nos. 09/715,803 and 60/280,398, which are assigned to the same assignee as the present application and are hereby incorporated by reference.

After passing through the etalon 4 on the first pass, the beam is retro-reflected back in a direction substantially anti-parallel to the direction that the beam was incident upon the retro-reflector. For example, a retro-reflection prism 6 or corner cube or corner reflector having reflecting sides substantial orientated at a 90° angle relative to each other. Preferably, these reflecting sides of the retro-reflector 6 are preferably within 0.1° or less of being perfectly normal to each other in order to achieve the desired anti-parallelism of the incident and retro-reflected beams. Other retro-reflectors such as HR mirrors may be used if it the desired anti-parallelism may be otherwise maintained, although the retro prism 6 shown in FIG. 1 is preferred as it provides a reliable retro-reflection without very great alignment efforts.

Figure 2:
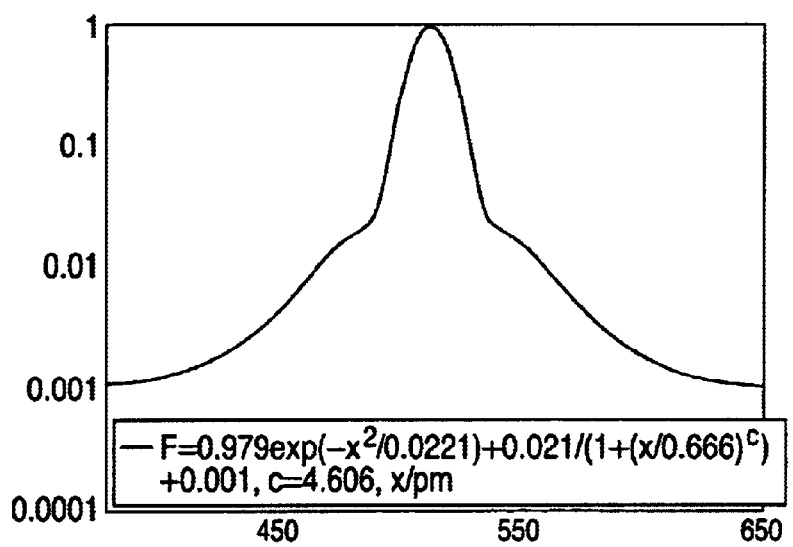

After the second pass through the etalon 4, or other interferometric device, the beam is input into a grating or etalon spectrometer 8. The apparatus function of the beam may then be determined. FIG. 2 schematically illustrates an apparatus function measured by the double-pass etalon arrangement schematically illustrated at FIG. 1. The free spectral range (FSR) of the etalon 4 was 5 pm and the finesse of the etalon 4 was 50 for performing the measurement shown in FIG. 2. The radiation incident upon the spectrometer is greatly reduced as a result of the second pass through the etalon 4 as compared with a single pass arrangement.

Another application of using an interferometric device such as an etalon, or an interferometric device not having parallel plates, configured into a multi-pass arrangement is in the measurement of the spectra of narrow band lasers. Advantages include a high dynamic range (comparable with a grating spectrometer) and compactness.

TWO EXAMPLES ARE SHOWN IN FIG. 3 AND FIG. 5

Figure 3:
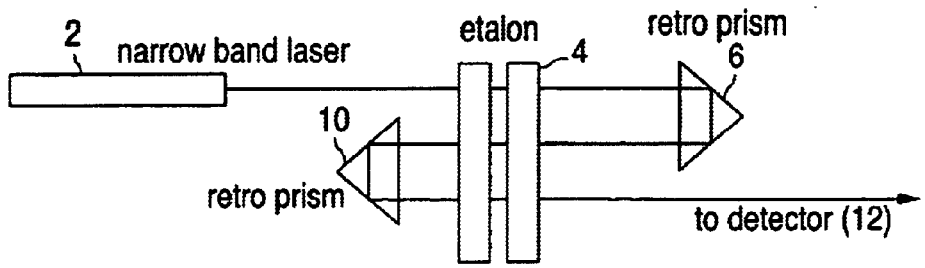
FIG. 3 schematically illustrates a triple-pass etalon arrangement according to a preferred embodiment.

FIG. 3 schematically illustrates a triple-pass etalon arrangement according to a preferred embodiment. As with the double-pass arrangement schematically shown in FIG. 1, the interferometric device 4 may be an etalon or alternatively a device not having parallel plates across the entirety of the interferometric reflecting surfaces, such as may be described in the '803 and/or '398 applications mentioned above. As shown in FIG. 3, a narrow band and/or tunable laser beam, or other laser beam wherein it may be desired to know the wavelength, bandwidth, spectral purity or other spectral parameter of the beam, or wherein it is desired to measure the apparatus function of the beam, traverses the etalon 4 on a first pass, and after retro-reflection, traverses the etalon 4 on a second pass, just as was described above with reference to FIG. 1. After traversing the etalon 4 on the second pass, the beam is incident upon a second retro-reflector 10 preferably having the same specifications as, or that are similar to, the first retro-reflector 6 (see above description). The beam is retro-reflected by the second retro-reflector preferably within 0.1° or less of perfectly anti-parallel to the beam incident upon the second retro-reflector 10. The beam passes through the etalon 4 on a third pass and is then incident upon a detector 12. As will be described in more detail below with reference to FIG. 5, the detector 12 may be an array detector or a photodiode. If the detector 12 is a photodiode, then the etalon 4 may be pressure- or otherwise-tuned so that the detector measures the intensity of the beam at multiple FSRs, such as over 2–4 FSRs, of the etalon 4, or the wavelength of the laser may be tuned so that the detector 12 measures the intensity of the beam at multiple wavelengths.

In order to avoid line-broadening resulting from the multi-pass through the etalon 4, either in the double- or triple-pass arrangements shown schematically at FIGS. 1 and 3, respectively, the following measurement conditions are preferably maintained. First, line broadening due to beam divergency $\Delta\Phi$ as well as the line line shift due to deviations $\Delta\alpha$ of the incidence angles of the different passes are less than 0.1 times the passive bandwidth of the single pass etalon, e.g., $(0.1 \cdot FSR)/\text{finesse}$. $\Delta\Phi$ and $\Delta\alpha$ may be preferably estimated from the etalon equation:

$$\Delta\Phi, \Delta\alpha < 0.3 \cdot (FSR/\lambda \cdot \text{finesse})^{0.5}.$$

Figure 4A:
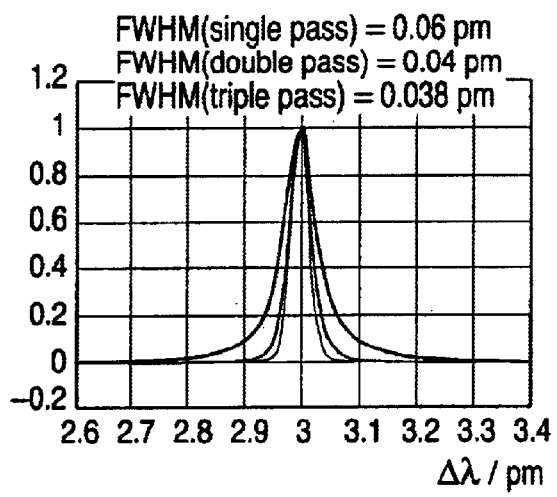
FIG. 4a shows plots of spectral apparatus functions measured by single-, double- and triple-pass etalon apparatuses; the double- and triple-pass apparatuses being according to preferred embodiments.
Figure 4B:
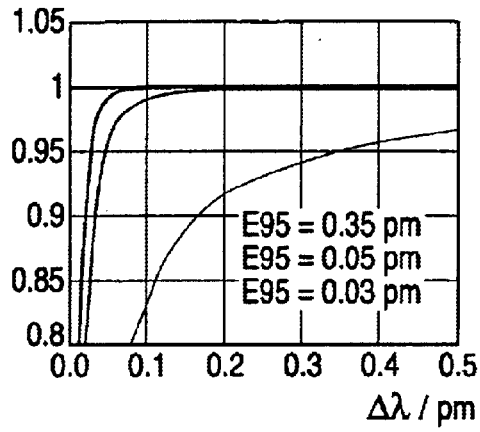

For exemplary values $\lambda=193$ nm, FSR=3 pm, and finesse=25, $\Delta\Phi$, $\Delta\alpha$ would be preferably maintained at less than approximately 0.25 mrad. If the above conditions are maintained, the spectral apparatus functions for single-, double- and triple-pass arrangements are depicted in FIG. 4$a$ which shows plots of spectral apparatus functions measured by single-, double- and triple-pass etalon apparatuses; the double- and triple-pass apparatuses being according to preferred embodiments. FIG. 4$b$ shows integrated spectra of the plots shown in FIG. 4$a$. The bandwidths for the three arrangements are shown in a legend in FIG. 4$a$, i.e., for single-pass, the full width at half maximum (FWHM) is 0.06 pm, for double-pass, FWHM is 0.04 pm and for triple-pass, FWHM is 0.038 pm (for $\lambda=193$ nm, FSR=3 pm, and finesse=25). The spectral purities for the three arrangements are shown in a legend in FIG. 4$b$, i.e., for single-pass, the spectral purity (E95) is 0.35 pm, for double-pass, E95 is 0.05 pm and for triple-pass, E95 is 0.03 pm (again for $\lambda=193$ nm, FSR=3 pm, and finesse=25).

Figure 5:
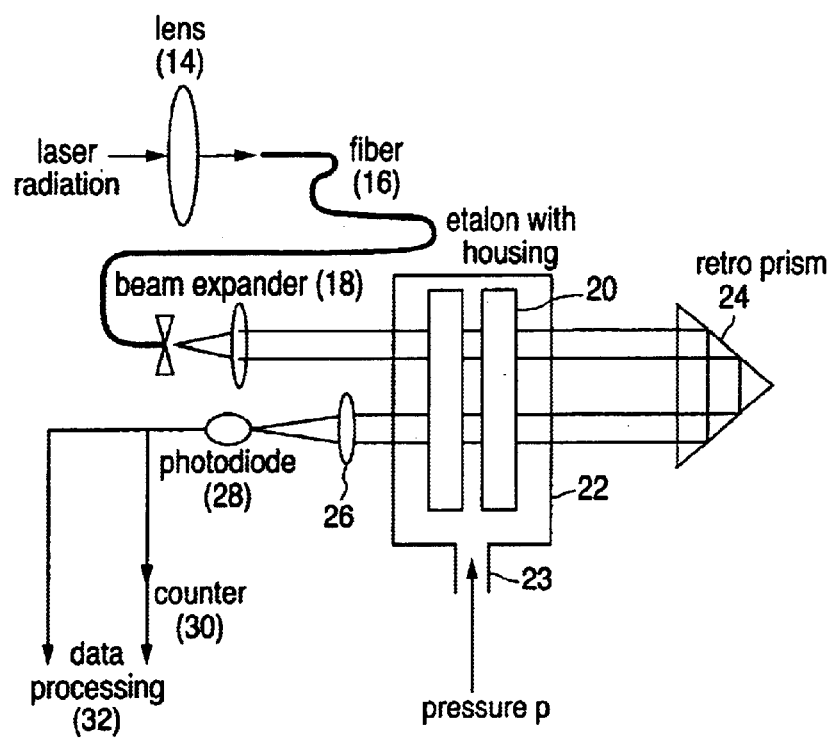
FIG. 5 schematically shows a double-pass etalon arrangement according to a particularly preferred embodiment.

FIG. 5 schematically shows a double-pass etalon arrangement according to a particularly preferred embodiment. Laser radiation is incident upon a lens 14 that focuses the laser radiation onto an input face of a light guidance cable 16 such as an optical fiber. The laser radiation may be otherwise incident upon the input face of the light guidance cable 16 as understood by those skilled in the art. The light is guided along the light guidance cable 16 and exits at an output face. The light exiting the output face of the light guidance cable is expanded by a beam expander 18 that may preferably be a pair of lenses, or may alternatively include one or more prisms or reflective optics. The lens 14, light guidance cable 16 and beam expander 18 may or may not be used, such as is illustrated at FIGS. 1 and 3. The beam expander 18 preferably reduces the divergency to a level less than 0.25 mrad (see above).

The expanded beam is incident upon an interferometric device 20 such as preferably an etalon, and alternatively an interferometric device including non-parallel reflecting plates. The etalon 20 is preferably disposed within a housing 22. The housing 22 preferably includes at least one port 23 for inserting or removing gas for controlling the pressure within the housing. The pressure may be maintained constant, such as by sealing the housing or closing a valve to the port 23 or by having a constant flow of gas through the housing, wherein the wavelength of the laser radiation is instead tuned through multiple wavelengths for obtaining spectral information by measuring an intensity of the beam at each wavelength.

The radiation that traverses the etalon 20 on a first pass is incident upon a retro-reflector 24 and is redirected anti-parallel, and preferably within 0.1° or less of perfectly anti-parallel, to its incident direction back toward the etalon 20 that is preferably within the housing 22. The radiation then traverses the etalon 20 on a second pass. Although not shown in FIG. 5, the radiation may traverse the etalon 20 on a third pass, such as according to the arrangement schematically shown in FIG. 3.

The radiation, after traversing the etalon 20 on at least a second pass, is then preferably incident upon a lens 26 that focuses the radiation onto a photodiode 28 for detecting the intensity of the radiation. The intensity information is preferably transmitted for data processing 32 such as to a computer. The intensity information may go through a counter 30 an then to data processing 32.

OVERALL LASER SYSTEM

Figure 6:
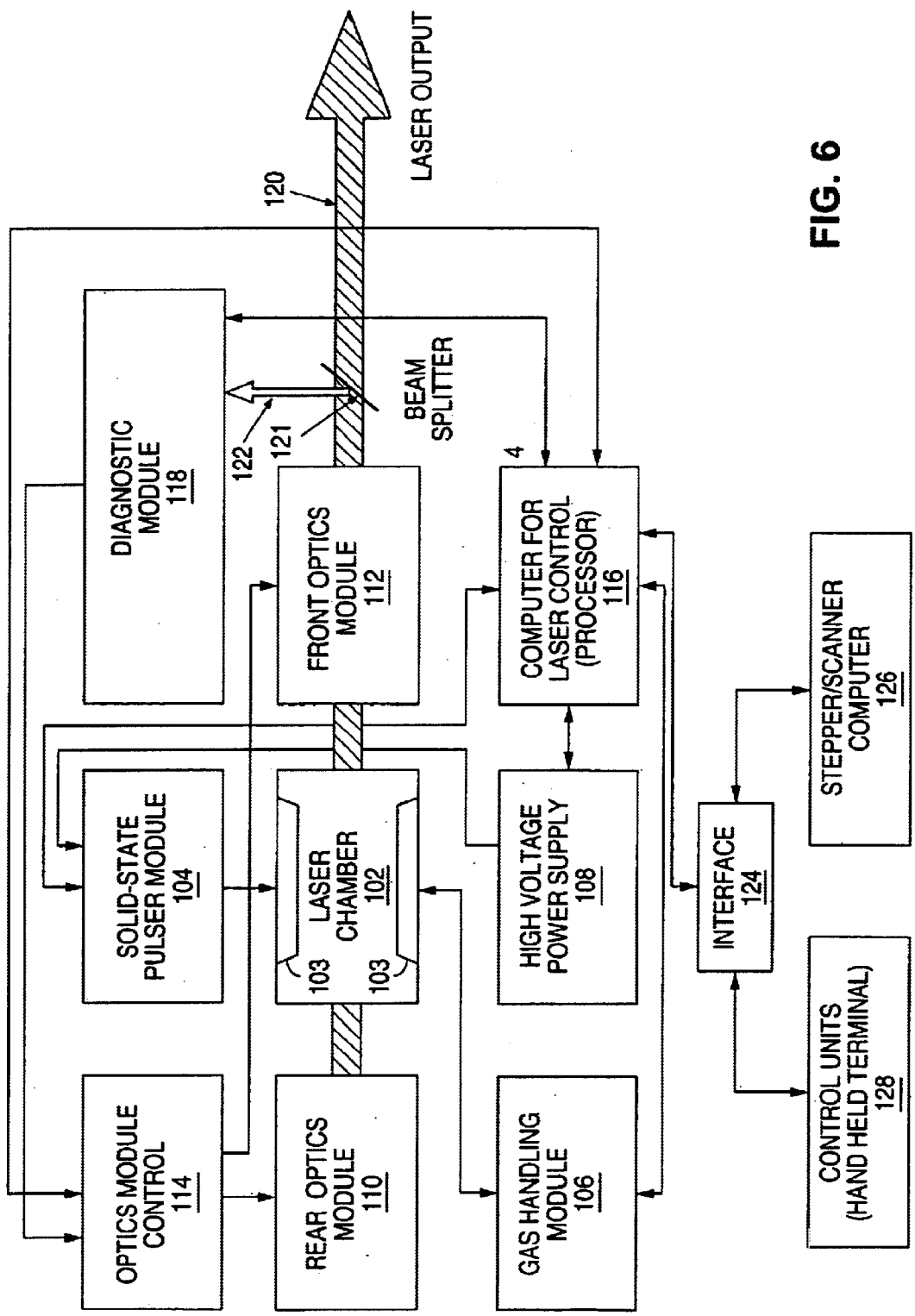
FIG. 6 schematically shows an overall excimer or molecular fluorine laser system according to a preferred embodiment.

FIG. 6 schematically illustrates an overall excimer or molecular fluorine laser system according to a preferred embodiment which preferably includes the advantageous features described above with reference to FIGS. 1–5. Referring to FIG. 6, a preferred excimer or molecular fluorine laser system is a DUV or VUV laser system, such as a KrF, ArF or molecular fluorine ($F_2$) laser system, for use with a deep ultraviolet (DUV) or vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 6 to meet the requirements of that application. For this purpose, alternative DUV or VUV laser system and component configurations are described at U.S. patent applications Ser. Nos. 09/317,695, 09/244,554, 09/452,353, 09/512,417, 09/599,130, 09/694,246, 09/712,877, 09/574,921, 09/738,849, 09/718,809, 09/629,256, 09/712,367, 09/771,366, 09/715,803, 09/738,849, 09/791,431, 60/204,095, 09/741,465, 09/574,921, 09/734,459, 09/741,465, 09/686,483, 09/584,420, 09/843,604, 09/780,120, 09/792,622, 09/791,431, 09/811,354, 09/838,715, 09/715,803, 09/717,757, 09/771,013, 09/791,430, 09/712,367 and 09/780,124, and U.S. Pat. Nos. 6,285,701, 6,005,880, 6,061,382, 6,020,723, 6,219,368, 6,212,214, 6,154,470, 6,157,662, 6,243,405, 6,243,406, 6,198,761, 5,946,337, 6,014,206, 6,157,662, 6,154,470, 6,160,831, 6,160,832, 5,559,816, 4,611,270, 5,761,236, 6,212,214, 6,243,405, 6,154,470, and 6,157,662, each of which is assigned to the same assignee as the present application and is hereby incorporated by reference.

DISCHARGE TUBE

The system shown in FIG. 6 generally includes a laser chamber 102 (or laser tube including a heat exchanger and fan for circulating a gas mixture within the chamber 102 or tube) having a pair of main discharge electrodes 103 connected with a solid-state pulser module 104, and a gas handling module 106. The gas handling module 106 has a valve connection to the laser chamber 102 so that halogen, any active rare gases and a buffer gas or buffer gases, and optionally a gas additive, may be injected or filled into the laser chamber, preferably in premixed forms (see U.S. patent applications Ser. Nos. 09/513,025, 09/780,120, 09/734,459 and 09/447,882, which are assigned to the same assignee as the present application, and U.S. Pat. Nos. 4,977,573, 4,393, 505 and 6,157,662, which are each hereby incorporated by reference. The solid-state pulser module 104 is powered by a high voltage power supply 108. A thyratron pulser module may alternatively be used. The laser chamber 102 is surrounded by optics module 110 and optics module 112, forming a resonator. The optics modules 110 and 112 may be controlled by an optics control module 114, or may be alternatively directly controlled by a computer or processor 116, particular when line-narrowing optics are included in one or both of the optics modules 110, 112, such as is preferred when KrF, ArF or $F_2$ lasers are used for optical lithography.

PROCESSOR CONTROL

The processor 116 for laser control receives various inputs and controls various operating parameters of the system. A diagnostic module 118 receives and measures one or more parameters, such as pulse energy, average energy and/or power, and preferably wavelength, of a split off portion of the main beam 120 via optics for deflecting a small portion 122 of the beam toward the module 118, such as preferably a beam splitter module 121. The beam 120 is preferably the laser output to an imaging system (not shown) and ultimately to a workpiece (also not shown) such as particularly for lithographic applications, and may be output directly to an application process. The laser control computer 116 may communicate through an interface 124 with a stepper/scanner computer, other control units 126, 128 and/or other external systems.

The processor or control computer 116 receives and processes values of some of the pulse shape, energy, ASE, energy stability, energy overshoot for burst mode operation, wavelength, spectral purity and/or bandwidth, among other input or output parameters of the laser system and output beam. The processor may receive signals corresponding to the wavefront compensation such as values of the bandwidth, and may control the wavefront compensation performed by the wavefront compensation optic 3, 13, 23 (see above) in a feedback loop by sending signals to adjust the pressure(s) and/or curvature(s) of surfaces associated with the wavefront compensation optic 3, 13, 23. The processor 116 also controls the line narrowing module to tune the wavelength and/or bandwidth or spectral purity, and controls the power supply and pulser module 104 and 108 to control preferably the moving average pulse power or energy, such that the energy dose at points on the workpiece is stabilized around a desired value. In addition, the computer 116 controls the gas handling module 106 which includes gas supply valves connected to various gas sources. Further functions of the processor 116 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 6, the processor 116 preferably communicates with the solid-state or thyratron pulser module 104 and HV power supply 108, separately or in combination, the gas handling module 106, the optics modules 110 and/or 112, the diagnostic module 118, and an interface 124. The laser resonator which surrounds the laser chamber 102 containing the laser gas mixture includes optics module 110 including line-narrowing optics for a line narrowed excimer or molecular fluorine laser, which may be replaced by a high reflectivity mirror or the like in a laser system wherein either line-narrowing is not desired, or if line narrowing is performed at the front optics module 112, or a spectral filter external to the resonator is used for narrowing the linewidth of the output beam.

SOLID STATE PULSER MODULE

The laser chamber 102 contains a laser gas mixture and includes one or more preionization units (not shown) in addition to the pair of main discharge electrodes 103. Preferred main electrodes 103 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860, 300, each of which is assigned to the same assignee, and alternative embodiments are set forth at U.S. Pat. Nos. 4,691,322, 5,535,233 and 5,557,629, all of which are hereby incorporated by reference. Preferred preionization units may be sliding surface or corona-type and are described U.S. patent applications Ser. Nos. 09/922,241 and 09/532,276 (sliding surface) and Ser. No. 09/692,265 and 09/247,887 (corona discharge), each of which is assigned to the same assignee as the present application, and additional alternative embodiments are set forth at U.S. Pat. Nos. 5,337,330, 5,818,865, 5,875,207 and 5,991,324, and German Gebrauchsmuster DE 295 21 572 U1, all of the above patents and patent applications being hereby incorporated by reference.

The solid-state or thyratron pulser module 104 and high voltage power supply 108 supply electrical energy in compressed electrical pulses to the preionization and main electrodes 103 within the laser chamber 102 to energize the gas mixture. Components of the preferred pulser module and high voltage power supply are described above, and further details may be described at U.S. patent applications Ser. Nos. 09/640,595, 09/838,715, 60/204,095, 09/432,348 and 09/390,146, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

RESONATOR, GENERAL

The laser resonator which surrounds the laser chamber 102 containing the laser gas mixture includes optics module 110 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 112, or a spectral filter external to the resonator is used, or if the line-narrowing optics are disposed in front of the HR mirror, for narrowing the bandwidth of the output beam. For an $F_2$-laser, optics for selecting one of multiple lines around 157 nm may be used, e.g., one or more dispersive prisms, birefringent plates or blocks and/or an interferometric device such as an etalon or a device having a pair of opposed, non-parallel plates such as described in the Ser. Nos. 09/715,803 and 60/280,398 applications, wherein the same optic or optics or an additional line-narrowing optic or optics for narrowing the selected line may be used. Also, particularly for the $F_2$-laser, and also possibly for other excimer lasers, the total gas mixture pressure may be lower than conventional systems, e.g., lower than 3 bar, for producing the selected line at a narrow bandwidth such as 0.5 pm or less without using additional line-narrowing optics (see U.S. patent application Ser. No. 09/883,128, which is assigned to the same assignee as the present application and is hereby incorporated by reference).

The laser chamber 102 is sealed by windows transparent to the wavelengths of the emitted laser radiation 120. The windows may be Brewster windows or may be aligned at another angle, e.g., 5°, to the optical path of the resonating beam. One of the windows may also serve to output couple the beam or as a highly reflective resonator reflector on the opposite side of the chamber 102 as the beam is outcoupled.

DIAGNOSTIC MODULE

After a portion of the output beam 120 passes the outcoupler of the optics module 112, that output portion preferably impinges upon a beam splitter module 121 which includes optics for deflecting a portion 122 of the beam to the diagnostic module 118, or otherwise allowing a small portion 122 of the outcoupled beam to reach the diagnostic module 118, while a main beam portion 120 is allowed to continue as the output beam 120 of the laser system (see U.S. patent applications Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 118. A holographic beam sampler, transmission grating, partially transmissive reflection diffraction grating, grism, prism or other refractive, dispersive and/or transmissive optic or optics may also be used to separate a small beam portion from the main beam 120 for detection at the diagnostic module 118, while allowing most of the main beam 120 to reach an application process directly or via an imaging system or otherwise. These optics or additional optics may be used to filter out visible radiation such as the red emission from atomic fluorine in the gas mixture from the split off beam prior to detection.

The output beam 120 may be transmitted at the beam splitter module while a reflected beam portion is directed at the diagnostic module 118, or the main beam 120 may be reflected, while a small portion is transmitted to the diagnostic module 118. The portion of the outcoupled beam which continues past the beam splitter module 121 is the output beam 120 of the laser, which propagates toward an industrial or experimental application such as an imaging system and workpiece for photolithographic applications.

The diagnostic module 118 preferably includes at least one energy detector. This detector measures the total energy of the beam portion that corresponds directly to the energy of the output beam 120 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 121 to control the intensity, spectral distribution and/or other parameters of the radiation impinging upon the detector (see U.S. patent applications Ser. Nos. 09/172,805, 09/741,465, 09/712,877, 09/771,013 and 09/771,366, each of which is assigned to the same assignee as the present application and is hereby incorporated by reference).

One other component of the diagnostic module 118 is preferably a wavelength and/or bandwidth detection component such as a monitor etalon or grating spectrometer, and a hollow cathode lamp or reference light source for providing absolute wavelength calibration of the monitor etalon or grating spectrometer (see U.S. patent applications Ser. Nos. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831, 6,269,110, 6,272,158 and 5,978,394, all of the above wavelength and/or bandwidth detection and monitoring components being hereby incorporated by reference). The bandwidth and/or wavelength or other spectral, energy or other beam parameter may be monitored and controlled in a feedback loop including the processor 116 and optics control modules 110, 112, gas handling module 106, power supply and pulser modules 103, 104, or other laser system component modules. For example, the total pressure of the gas mixture in the laser tube 102 may be controlled to a particular value for producing an output beam at a particular bandwidth and/or energy.

Other components of the diagnostic module may include a pulse shape detector or ASE detector, such as are described at U.S. Pat. Nos. 6,243,405 and 6,243,406 and U.S. patent application Ser. No. 09/842,281, which is assigned to the same assignee as the present application, each of which are hereby incorporated by reference, such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

BEAM PATH ENCLOSURE

Particularly for the molecular fluorine laser system, and also for the ArF and KrF laser systems, an enclosure (not shown) preferably seals the beam path of the beam 120 such as to keep the beam path free of photoabsorbing or other contaminant species that can tend to attenuate and/or otherwise disturb the beam such as by providing a varying refractive index along the optical path of the beam. Smaller enclosures preferably seal the beam path between the chamber 102 and the optics modules 110 and 112 and between the beam splitter 122 and the diagnostic module 118 (see the Ser. Nos. 09/317,695, 09/594,892 and 09/598,552 applications, incorporated by reference above). The optics modules 110 and 112 are maintained in an atmosphere that is sufficiently evacuated or have an inert gas purged atmosphere. Preferred enclosures are described in detail in U.S. patent applications Ser. Nos. 09/598,552, 09/594,892, 09/727,600, 09/317,695 and 09/131,580, which are assigned to the same assignee and are hereby incorporated by reference, and U.S. Pat. Nos. 6,219,368, 5,559,584, 5,221,823, 5,763,855, 5,811,753 and 4,616,908, all of which are hereby incorporated by reference.

GAS MIXTURE

The laser gas mixture is initially filled into the laser chamber 102 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162, 6,243,406 and 4,977,573 and U.S. patent applications Ser. Nos. 09/513,025, 09/447,882, 09/789,120 and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the Ser. No. 09/513,025 application incorporated by reference above. Specifically, for the $F_2$-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Gas replenishment actions are described below for gas mixture compositions of systems such as ArF, KrF, and XeCl excimer lasers and molecular fluorine lasers, wherein the ideas set forth herein may be advantageously incorporated into any of these systems, and other gas discharge laser systems.

GAS REPLENISHMENT

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 102 of, e.g., 100 liters, total pressure adjustments and gas replacement procedures may be performed using the gas handling module 106 preferably including a vacuum pump, a valve network and one or more gas compartments. The gas handling module 106 receives gas via gas lines connected to gas containers, tanks, canisters and/or bottles. Some preferred and alternative gas handling and/or replenishment procedures, other than as specifically described herein (see below), are described at U.S. Pat. Nos. 4,977,573, 6,212,214, 6,243,406 and 5,396,514 and U.S. patent applications Ser. Nos. 09/447,882, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas or other gas additive supply may be included either internal or external to the laser system according to the '025 application, mentioned above.

Total pressure adjustments in the form of releases of gases or reduction of the total pressure within the laser tube 102 may also be performed. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the Ser. No. 09/734,459 application, incorporated by reference above. As an example, the gas handling unit 106 connected to the laser tube 102 either directly or through an additional valve assembly, such as may include a small compartment for regulating the amount of gas injected (see the '459 application), may include a gas line for injecting a premix A including 1%$F_2$:99%Ne or other buffer gas such as He, and another gas line for injecting a premix B including 1% rare gas:99% buffer gas, for a rare gas-halide excimer laser, wherein for a $F_2$ laser premix B is not used. Another line may be used for injecting a gas additive or gas additive premix, or a gas additive may be added to premix A, premix B or a buffer gas. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 102 via the valve assembly, the fluorine concentration in the laser tube 102 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, or more depending on the degree of stability desired, and any and all other gas replenishment actions are initiated and controlled by the processor 116 which controls valve assemblies of the gas handling unit 106 and the laser tube 102 based on various input information in a feedback loop. These gas replenishment procedures may be used in combination with gas circulation loops and/or window replacement procedures to achieve a laser system having an increased servicing interval for both the gas mixture and the laser tube windows.

LINE NARROWING

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or less). These exemplary embodiments may be used along with the wavefront compensating optic 3, 13, 13 described above. For the $F_2$ laser, the optics may be used for selecting the primary line $\lambda_1$ only of multiple lines around 157 nm, or may be used to provide additional line narrowing as well as performing line-selection, or the resonator may include optics for line-selection and additional optics for line-narrowing of the selected line, and line-narrowing may be provided by controlling (i.e., reducing) the total pressure (see U.S. patent application Ser. No. 60/212,301, which is assigned to the same assignee and is hereby incorporated by reference). Line-narrowing of the broadband emission of the ArF and/or KrF lasers may be as set forth below.

Exemplary line-narrowing optics contained in the optics module 110 include a beam expander, an optional interferometric device such as an etalon or a device having a pair of opposed non-planar reflection plates such as may be described in the Ser. Nos. 09/715,803 or 60/280,398 applications, which are assigned to the same assignee as the present application and are hereby incorporated by reference, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the Ser. Nos. 091715, 803, 09/738,849, and 09/718,809 applications, each being assigned to the same assignee and hereby incorporated by reference.

Instead of having a retro-reflective grating in the rear optics module 110, the grating may be replaced with a highly reflective mirror, and a lower degree of dispersion may be produced by a dispersive prism, or a beam expander and an interferometric device such as an etalon or device having non-planar opposed plates may be used for line-selection and narrowing, or alternatively no line-narrowing or line-selection may be performed in the rear optics module 110. In the case of using an all-reflective imaging system, the laser may be configured for semi-narrow band operation such as having an output beam linewidth in excess of 0.5 pm , depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 110 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the Ser. No. 09/771,366 application and the Ser. No. 6,154,470 patent, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

ADDITIONAL LASER SYSTEM FEATURES

Optics module 112 preferably includes means for outcoupling the beam 120, such as a partially reflective resonator reflector. The beam 120 may be otherwise outcoupled such as by an intra-resonator beam splitter or partially reflecting surface of another optical element, and the optics module 112 would in this case include a highly reflective mirror. The optics control module 114 preferably controls the optics modules 110 and 112 such as by receiving and interpreting signals from the processor 116, and initiating realignment, gas pressure adjustments in the modules 110, 112, or reconfiguration procedures (see the '353, '695, '277, '554, and '527 applications mentioned above).

The halogen concentration in the gas mixture is maintained constant during laser operation by gas replenishment actions by replenishing the amount of halogen in the laser tube for the preferred excimer or molecular fluorine laser herein, such that these gases are maintained in a same predetermined ratio as are in the laser tube 102 following a new fill procedure. In addition, gas injection actions such as $\mu$Hls as understood from the '882 application, mentioned above, may be advantageously modified into micro gas replacement procedures, such that the increase in energy of the output laser beam may be compensated by reducing the total pressure. In addition, the laser system is preferably configured for controlling the input driving voltage so that the energy of the output beam is at the predetermined desired energy. The driving voltage is preferably maintained within a small range around $HV_{opt}$, while the gas procedure operates to replenish the gases and maintain the average pulse energy or energy dose, such as by controlling an output rate of change of the gas mixture or a rate of gas flow through the laser tube 102. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 091780,120, which is assigned to the same assignee as the present application and is hereby incorporated by reference).

In all of the above and below embodiments, the material used for any dispersive prisms, the prisms of any beam expanders, etalons or other interferometric devices, laser windows and the outcoupler is preferably one that is highly transparent at excimer or molecular fluorine laser wavelengths such as 248 nm for the KrF laser, 193 nm for the ArF laser and 157 nm for the $F_2$ laser. The materials are also capable of withstanding long-term exposure to ultraviolet light with minimal degradation effects. Examples of such materials are $CaF_2$, $MgF_2$, BaF2, LiF and $SrF_2$, and in some cases fluorine-doped quartz may be used, and for the KrF laser, fused silica may be used. Also, in all of the embodiments, many optical surfaces, particularly those of the prisms, may or may not have an anti-reflective coating on one or more optical surfaces, in order to minimize reflection losses and prolong their lifetime.

Also, the gas composition for the excimer or molecular fluorine laser in the above configurations uses either helium, neon, or a mixture of helium and neon as a buffer gas. For rare gas-halide excimer lasers, the rare gas is preferably maintained at a concentration of around 1.0% in the gas mixture. The concentration of fluorine in the gas mixture preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and/or oxygen, and/or krypton and/or other gases (see the '025 application) may be used for increasing the energy stability, burst control, and/or output energy of the laser beam. The concentration of xenon, argon, oxygen, or krypton in the mixture as a gas additive may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

A line-narrowed oscillator, e.g., a set forth above, may be followed by a power amplifier for increasing the power of the beam output by the oscillator. Preferred features of the oscillator-amplifier set-up are set forth at U.S. patent applications Ser. Nos. 09/599,130 and 60/228,184, which are assigned to the same assignee and are hereby incorporated by reference. The amplifier may be the same or a separate discharge chamber 102. An optical or electrical delay may be used to time the electrical discharge at the amplifier with the reaching of the optical pulse from the oscillator at the amplifier. With particular respect to the $F_2$-laser, a molecular fluorine laser oscillator may have an advantageous output coupler having a transmission interference maximum at $\lambda_1$ and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Watts to more than 10 Watts).

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention, as defined by the claims below, and structural and functional equivalents thereof.

What is claimed is:

1. An apparatus for measuring a spectral distribution of a narrow-band laser beam generated by a line-narrowed excimer laser or a molecular fluorine laser system, comprising:
   an interferometric device disposed along an optical path of an output beam of the laser system such that the beam traverses the interferometric device on a first pass;
   a retro-reflector disposed after the interferometric device along said optical path for retro-reflecting the beam back through the interferometric device on a second pass; and
   a detector for measuring an intensity of the beam after the second pass through the interferometric device, and
   wherein the interferometric device is tunable to any of a plurality of free spectral ranges, such that the beam traversing the interferometric device is tuned over one of the plurality of free spectral ranges, and
   wherein spectral information is determined by using the detector to measure the intensity of the beam at each of the plurality of free spectral ranges.

2. The apparatus of claim 1, wherein the detector includes a photodiode.

3. The apparatus of claim 1, further comprising a light guidance cable, wherein the beam is directed towards the interferometric device through the light guidance cable.

4. The apparatus of claim 3, wherein the light guidance cable includes a fiber optic.

5. The apparatus of claim 3, further comprising a beam expander for expanding the beam after traversing the light guidance cable and before being incident upon the interferometric device.

6. The apparatus of claim 3, further comprising a focusing lens, wherein the output beam is focused onto an input face of the light guidance cable by the lens.

7. The apparatus of claim 3, wherein the beam makes a third interferometric pass prior to being incident upon the detector.

8. The apparatus of claim 7, further comprising a second retro-reflector disposed after the first retro-reflector along the optical path of the bean, and after the beam has traversed the interferometric device on the second pass, the second retro-reflector for retro-reflecting the beam back through the interferometric device on the third pass.

9. The apparatus of claim 1, wherein the beam makes a third interferometric pass prior to being incident upon the detector.

10. The apparatus of claim 9, further comprising a second retro-reflector disposed after the first retro-reflector along the optical path of the beam, and after the beam has traversed the interferometric device on the second pass, the second retro-reflector for retro-reflecting the beam back through the interferometric device on the third pass.

11. The apparatus of claim 1, wherein the apparatus is configured such that line broadening due to divergency is less than 0.1 times the passive bandwidth of a single pass through the interferometric device.

12. The apparatus of claim 1, wherein the apparatus is configured such that line shift due to deviations of incident angles of the first and second passes is less than 0.1 times the passive bandwidth of a single pass through the interferometric device.

13. The apparatus of claim 1, wherein the apparatus is configured such that line broadening due to divergency and line shift due to deviations of incident angles of the first and second passes are in combination less than 0.1 times the passive bandwidth of a single pass through the interferometric device.

14. An apparatus for measuring a spectral distribution of a narrow-band laser beam generated by a line-narrowed excimer laser or a molecular fluorine laser system, comprising:
   a tunable interferometric device disposed along an optical path of an output beam of the laser system, such that the beam traverses the tunable interferometric device on a first pass and is tuned over one of a plurality of free spectral ranges;
   a retro-reflector disposed after the tunable interferometric device along said optical path for retro-reflecting the beam back through the tunable interferometric device on a second pass; and
   a detector for measuring an intensity of the beam tuned to said one of a plurality of free spectral ranges after the second pass through the interferometric device, and wherein spectral information is determined by measuring the intensity of the beam at each of the plurality of free spectral ranges.

15. The apparatus of claim 14, wherein the detector includes a photodiode.

16. The apparatus of claim 14, further comprising a housing within which the interferometric device is disposed, and wherein the free spectral range of the interferometric device is tuned by varying a pressure within the housing.

17. The apparatus of claim 14, further comprising a light guidance cable, wherein the beam is directed towards the interferometric device through the light guidance cable.

18. The apparatus of claim 17, wherein the light guidance cable includes a fiber optic.

19. The apparatus of claim 17, further comprising a beam expander for expanding the beam after traversing the light guidance cable and before being incident upon the interferometric device.

20. The apparatus of claim 17, further comprising a focusing lens, wherein the output beam is focused onto an input face of the light guidance cable by the lens.

21. The apparatus of claim 17, wherein the beam makes a third interferometric pass prior to being incident upon the detector.

22. The apparatus of claim 21, further comprising a second retro-reflector disposed after the first retro-reflector along the optical path of the beam, and after the beam has traversed the interferometric device on the second pass, the second retro-reflector for retro-reflecting the beam back through the interferometric device on the third pass.

23. The apparatus of claim 14, wherein the beam makes a third interferometric pass prior to being incident upon the detector.

24. The apparatus of claim 23, further comprising a second retro-reflector disposed after the first retro-reflector along the optical path of the beam, and after the beam has traversed the interferometric device on the second pass, the second retro-reflector for retro-reflecting the beam back through the interferometric device on the third pass.

25. The apparatus of claim 14, wherein the apparatus is configured such that line broadening due to divergency is less than 0.1 times the passive bandwidth of a single pass through the interferometric device.

26. The apparatus of claim 14, wherein the apparatus is configured such that line shift due to deviations of incident angles of the first and second passes is less than 0.1 times the passive bandwidth of a single pass through the interferometric device.

27. The apparatus of claim 14, wherein the apparatus is configured such that line broadening due to divergency and line shift due to deviations of incident angles of the first and second passes are in combination less than 0.1 times the passive bandwidth of a single pass through the interferometric device.

28. An apparatus for measuring a spectral distribution of a narrow-band laser beam generated by a line-narrowed excimer laser or a molecular fluorine laser system, comprising:
an interferometric device disposed along an optical path of an output beam of the laser system such that the beam traverses the interferometric device on a first pass;
a retro-reflector disposed after the interferometric device along said optical path for retro-reflecting the beam back through the interferometric device on a second pass;
a detector for detecting an intensity of the beam after the second pass through the interferometric device; and
a light guidance cable for directing the beam towards the interferometric device;
wherein the interferometric device is tunable such that beam traversing the interferometric device is tuned over one of a plurality of free spectral ranges of the interferometric device, and the spectral distribution is determined by examining each of the plurality of free spectral ranges.

29. The apparatus of claim 28, wherein the light guidance cable includes a fiber optic.

30. The apparatus of claim 28, further comprising a beam expander for expanding the beam after traversing the light guidance cable and before being incident upon the interferometric device.

31. The apparatus of claim 28, further comprising a focusing lens, wherein the output beam is focused onto an input face of the light guidance cable by the lens.

32. An apparatus for measuring a spectral distribution of a narrow-band laser beam generated by a line-narrowed excimer laser or a molecular fluorine laser system, comprising:
a pressure-tunable interferometric device disposed along an optical path of an output beam of the laser system such that the beam traverses the interferometric device on a first pass, the pressure-tunable interferometric device being tunable to any of a plurality of free spectral ranges;
a retro-reflector disposed after the interferometric device along said optical path for retro-reflecting the beam back through the interferometric device on a second pass;
a detector for detecting an intensity of the beam over one of said plurality of free spectral ranges after the second pass through the interferometric device, and
wherein the beam makes a third interferometric pass prior to being incident upon the detector, and the spectral distribution can be measured by detecting an intensity of the beam at each of said plurality of free spectral ranges.

33. The apparatus of claim 32, further comprising a second retro-reflector disposed after the first retro-reflector along the optical path of the beam, and after the beam has traversed the interferometric device on the second pass, the second retro-reflector for retro-reflecting the beam back through the interferometric device on the third pass.

34. The apparatus of claim 32, wherein the apparatus is configured such that line broadening due to divergency is less than 0.1 times the passive bandwidth of a single pass through the interferometric device.

35. The apparatus of claim 32, wherein the apparatus is configured such that line shift due to deviations of incident angles of the first and second passes is less than 0.1 times the passive bandwidth of a single pass through the interferometric device.

36. The apparatus of claim 32, wherein the apparatus is configured such that line broadening due to divergency and line shift due to deviations of incident angles of the first and second passes are in combination less than 0.1 times the passive bandwidth of a single pass through the interferometric device.

37. The apparatus of claim 32, further comprising a light guidance cable, wherein the beam is directed towards the interferometric device through the light guidance cable.

38. The apparatus of claim 37, wherein the light guidance cable includes a fiber optic.

39. The apparatus of claim 37, further comprising a beam expander for expanding the beam after traversing the light guidance cable and before being incident upon the interferometric device.

40. The apparatus of claim 37, further comprising a focusing lens, wherein the output beam is focused onto an input face of the light guidance cable by the lens.

41. An apparatus for measuring a spectral distribution of a narrow-band laser beam generated by a line-narrowed excimer laser or a molecular fluorine laser system, comprising:

an interferometric device disposed along an optical path of an output beam of the laser system such that the beam traverses the interferometric device on a first pass;

a retro-reflector disposed after the interferometric device along said optical path for retro-reflecting the beam back through the interferometric device on a second pass; and a detector for detecting an intensity of the beam after the second pass through the interferometric device, and wherein spectral information is determined by the detector making a plurality of measurements of the intensity of the beam, each measurement being made when the interferometric device is tuned to a free spectral range of the interferometric device.

42. The apparatus of claim 41, wherein the interferometric device includes an etalon.

43. The apparatus of claim 41, wherein the interferometric device is tuned by adjusting the gas pressure between reflecting surfaces of the interferometric device.

44. The apparatus of claim 43, wherein the plurality of measurements are made by the detector at a plurality of gas pressures between the reflecting surfaces of the interferometric device.

45. The apparatus of claim 41, wherein the beam makes a third interferometric pass prior to being incident upon the detector.

46. The apparatus of claim 45, further comprising a second retro-reflector disposed after the first retro-reflector along the optical path of the beam, and after the beam has traversed the interferometric device on the second pass, the second retro-reflector for retroreflecting the beam back through the interferometric device on the third pass.

47. The apparatus of claim 41, wherein the apparatus is configured such that line broadening due to divergency is less than 0.1 times the passive bandwidth of a single pass through the interferometric device.

48. The apparatus of claim 41, wherein the apparatus is configured such that line shift due to deviations of incident angles of the first and second passes is less than 0.1 times the passive bandwidth of a single pass through the interferometric device.

49. The apparatus of claim 41, wherein the apparatus is configured such that line broadening due to divergency and line shift due to deviations of incident angles of the first and second passes are in combination less than 0.1 times the passive bandwidth of a single pass through the interferometric device.

* * * * *